United States Patent [19]

Eitoku et al.

[11] Patent Number: 4,719,795

[45] Date of Patent: Jan. 19, 1988

[54] THROTTLE VALVE OPENING SENSOR

[75] Inventors: Kenji Eitoku; Kenji Hayashi, both of Obu, Japan

[73] Assignee: Aisan Kogyo Kabushiki Kaisha, Obu, Japan

[21] Appl. No.: 927,877

[22] Filed: Nov. 7, 1986

[30] Foreign Application Priority Data

Nov. 8, 1985 [JP] Japan .................... 60-172600[U]

[51] Int. Cl.$^4$ ........................................ G01M 15/00
[52] U.S. Cl. ................................. 73/118.1; 338/171
[58] Field of Search ................. 73/118.1; 338/72, 95, 338/171, 185

[56] References Cited

U.S. PATENT DOCUMENTS 4,274,074  6/1981  Sakamoto .................. 338/171 X

FOREIGN PATENT DOCUMENTS 59-41708  3/1984  Japan .

Primary Examiner—Jerry W. Myracle
Attorney, Agent, or Firm—Dennison, Meserole, Pollack & Scheiner

[57] ABSTRACT

In a throttle valve opening sensor including a substrate provided with an opening detecting portion for detecting openings of a throttle valve and a specific opening detecting portion for detecting a specific opening of the throttle valve, the specific opening detecting portion consisting of a collector and a conductor, a rotor adapted to be rotated in association with rotation of the throttle valve, and first and second contacts mounted to the rotor and adapted to slide on the opening detecting portion and the specific opening detecting portion, thereby detecting the openings and the specific opening of the throttle valve; the improvement is characterized in that the collector and the conductor of the specific opening detecting portion comprises a metal conductor, and that a resin member is arranged on the substrate in connection with the collector and the conductor, the resin member being made substantially flush with the collector and the conductor, wherein the second contact is slid on the resin member.

2 Claims, 9 Drawing Figures

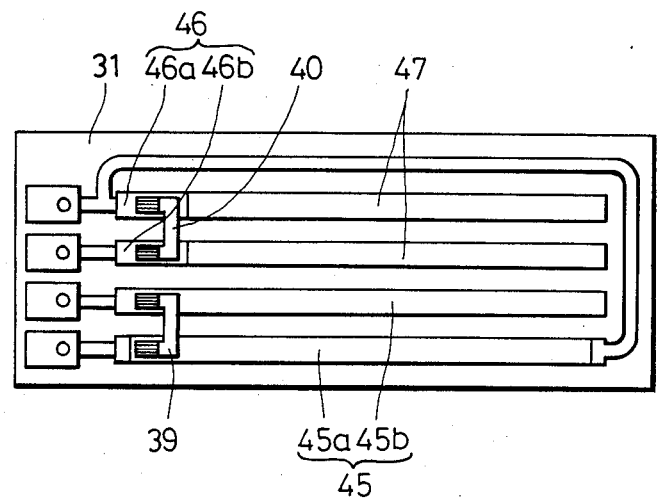
FIG.6
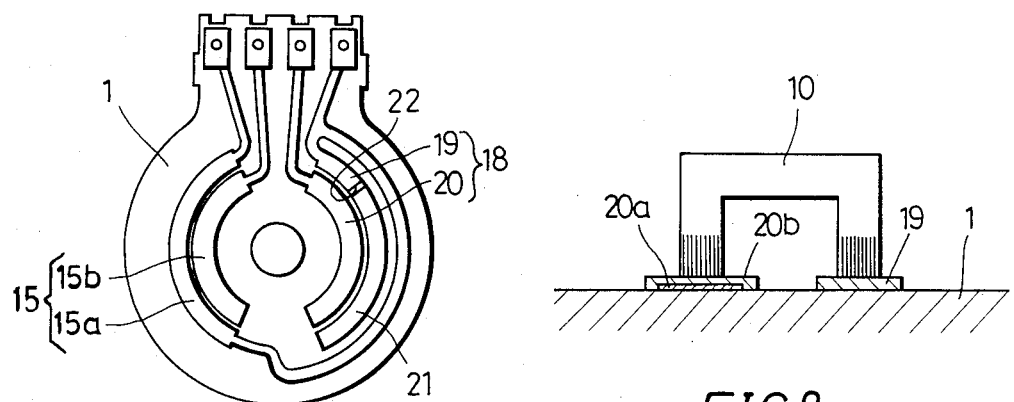
FIG.7 PRIOR ART
FIG.8 PRIOR ART

THROTTLE VALVE OPENING SENSOR

BACKGROUND OF THE INVENTION

The present invention relates to a throttle valve opening sensor for use with an internal combustion engine.

A conventional throttle valve opening sensor is shown in FIGS. 7 and 8 as disclosed in Japanese Laid-Open Utility Model Publication No. 59-41708. As shown in FIGS. 7 and 8, the throttle valve opening sensor comprises a substrate 1 on which an opening detecting portion 15 and a specific opening detecting portion 18 are printed, and a rotor arranged in opposed relation to the substrate 1 in such a manner as to be rotatable in association with rotation of a throttle valve. The rotor is provided with two pairs of contacts (not shown in FIG. 7). The contacts are designed to contact with the opening detecting portion 15 and the specific opening detecting portion 18, thereby detecting a throttle valve opening necessary for fuel control in engine operation and a specific opening such as an idling position. The specific opening detecting portion 18 consists of a metal conductor 19 and a collector 20 arranged inside the conductor 19. A soft glass insulator member 22 is arranged adjacent to the conductor 19, and a resistor member 21 such as a carbon resistor is arranged adjacent to the insulator member 22 for the purpose of preventing wear of the contact 10. The collector 20 consists of a metal conductor 20a formed of Ag-Pd alloy and a resistor member 20b such as a carbon resistor provided on the metal conductor 20a for the purpose of preventing migration of Ag and wear of the contact 10.

In the construction of the conventional throttle valve opening sensor, as the resistor member 20b is printed on the metal conductor 20a, an electrical contact resistance between the contact 10 and the resistor member 20b is large. As a result, a specific opening of the throttle valve such as an idling position cannot be accurately detected.

SUMMARY OF THE INVENTION

It is a primary object of the present invention to provide a throttle valve opening sensor which may accurately detect a specific opening of the throttle valve.

It is another object of the present invention to provide a throttle valve opening sensor which may prevent wear of the contact sliding on the specific opening detecting portion.

It is a further object of the present invention to provide a throttle valve opening sensor which may prevent migration of Ag contained in the metal conductor of the specific opening detecting portion.

According to the present invention, in a throttle valve opening sensor including a substrate provided with an opening detecting portion for detecting openings of a throttle valve and a specific opening detecting portion for detecting a specific opening of the throttle valve, the specific opening detecting portion consisting of a collector and a conductor, a rotor adapted to be rotated in association with rotation of the throttle valve, and first and second contacts mounted to the rotor and adapted to slide on the opening detecting portion and the specific opening detecting portion, thereby detecting the openings and the specific opening of the throttle valve; the improvement is characterized in that the collector and the conductor of the specific opening detecting portion comprises a metal conductor, and that a resin member is arranged on the substrate in connection with the collector and the conductor, the resin member being made substantially flush with the collector and the conductor, wherein the second contact is slid on the resin member.

With this arrangement, when the second contact is moved from the collector and the conductor to the resin member, the contact is reliably switched off, and accordingly, the specific opening of the throttle valve may be accurately detected. Furthermore, wear of the second contact may be reduced since the resin member is made substantially flush with the collector and the conductor, that is, no stepped portion is formed between the collector and the resin member and between the conductor and the resin member, and the contact surface of the resin members is smooth.

The invention will be more fully understood from the following detailed description and appended claims when taken with the drawings.

BRIEF DESCRIPTION OF THE DRAWINGS

FIG. 6 is a plan view of the substrate constituting the throttle valve opening sensor of a second preferred embodiment;

FIG. 7 is a plan view of the opening detecting portion and the specific opening detecting portion provided on the substrate in the prior art; and FIG. 8 is an enlarged sectional view of an essential part of the specific opening detecting portion shown in FIG. 7.

DETAILED DESCRIPTION OF THE PREFERRED EMBODIMENTS

Figure 1:
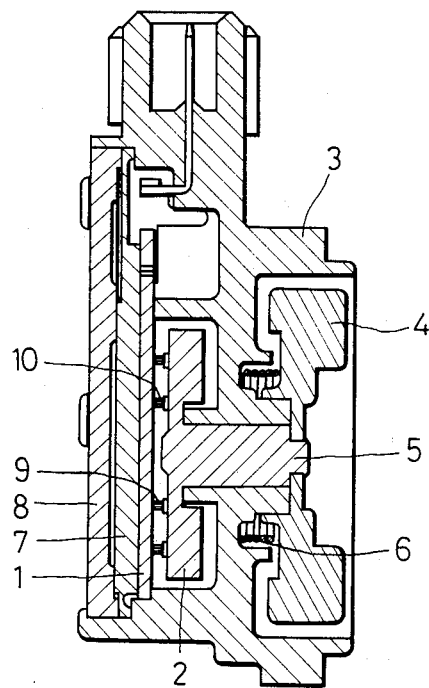
FIG. 1 is a vertical sectional view of a first preferred embodiment of the present invention.

Referring to FIGS. 1 to 5 wherein like parts in FIGS. 7 and 8 are designated by the same reference numerals, reference numeral 3 designates a housing for incorporating a substrate 1, a rotor 2 and an external connecting lever 4. The housing 3 is formed with a bearing portion for rotatably supporting a shaft 5 of the rotor 2. The rotor 2 is provided with first and second contacts 9 and 10 each having a pair of contact portions. The substrate 1 is positioned in the housing 3 so that the contacts 9 and 10 come into contact therewith.

Terminals 11 and 14 connected with power supply lead wires are connected to the substrate 1. Similarly, terminals 12 and 13 connected with signal output lead wires are connected to the substrate 1.

The shaft 5 of the rotor 2 is inserted into the bearing portion of the housing 3. A return spring (torsion spring) 6 is provided between the housing 3 and the external connecting lever 4 in such a manner that one end of the spring 6 is fixed to the lever 4, and the other end is fixed to the housing 3, thereby resiliently restricting the rotation of the lever 4. The external connecting lever 4 is connected to the shaft 5 of the rotor 2.

The rotor 2 is rotated in association with rotation of a throttle valve (not shown), and as a result, the first and second contacts 9 and 10 fixed to the rotor 2 are slid on the upper surfaces of a throttle valve opening detecting portion 15 and an idling position detecting portion 16 both printed on the substrate 1.

Figure 3A:
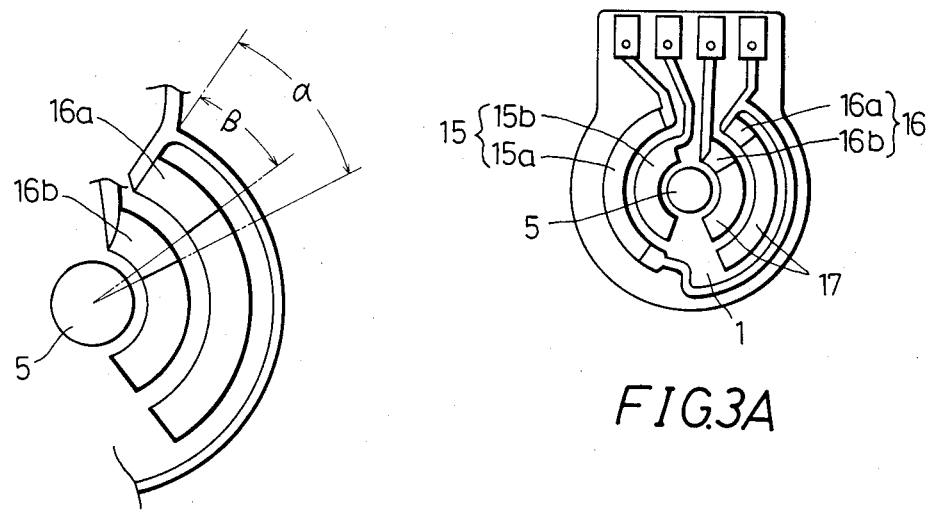
FIG. 3A is a plan view of the opening detecting portion and the specific opening portion provided on the substrate.
Figure 3B:
FIG. 3B is an enlarged plan view of an essential part in FIG. 3A.
Figure 2:
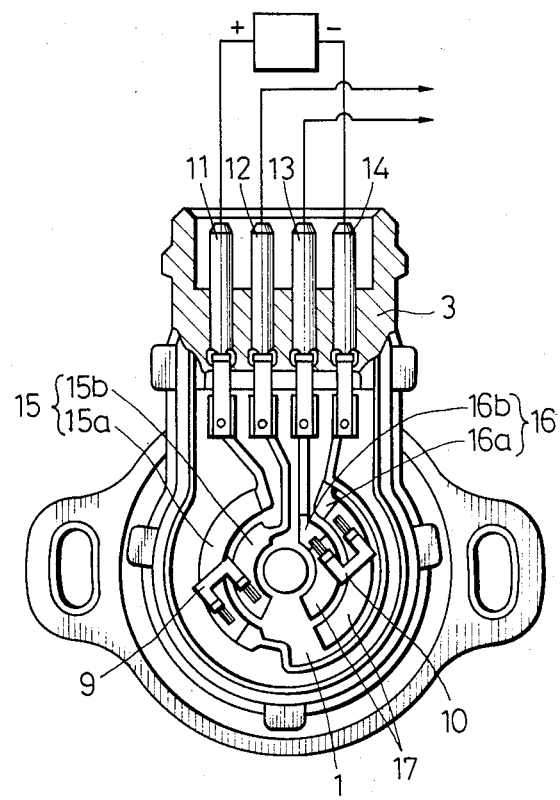
FIG. 2 is a sectional plan view of an essential part in FIG. 1.
Figure 5:
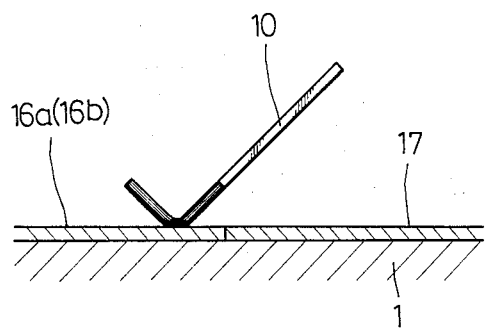
FIG. 5 is an enlarged sectional view of the essential part as seen from a right-hand side in FIG. 4.
Figure 4:
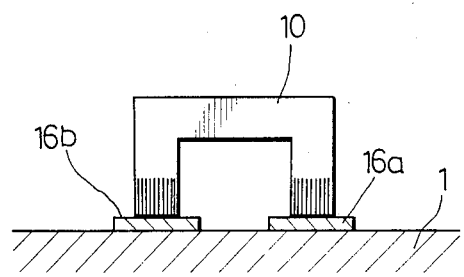
FIG. 4 is an enlarged sectional view of an essential part of the specific opening detecting portion.

As shown in FIG. 3A, the throttle valve opening detecting portion 15 printed on the substrate 1 has a form of partial sector about the center of the shaft 5 of the rotor 2. The idling position detecting portion 16 printed on the substrate 1 is opposed to the opening detecting portion 15, and has a form of partial sector about the center of the shaft 5. The opening detecting portion 15 consists of a resistor 15a and a collector 15b, while the idling position detecting portion 16 consists of a conductor 16a and a collector 16b. The conductor 16a and the collector 16b are formed of a metal conductor. Resin members 17 are printed on the substrate 1, and are arranged adjacent to the conductor 16a and the collector 16b. The resin members 17 are in the form of partial sector, and are made substantially flush with the conductor 16a and the collector 16b. The conductor 16a is separated from the collector 16b at a distance of 0.5-3 mm. The metal conductor contains Ag in an amount less than 73% and Pd or other metals in an amount equal to or more than 27%. With this specific composition, migration of Ag contained in the metal conductor may be prevented to thereby secure insulation between the conductor 16a and the collector 16b. Furthermore, as shown in FIG. 3B, an angle α of the collector 16b with respect to the center of the shaft 5 of the rotor 2 is greater by 1-5 degrees than an angle β of the conductor 16a with respect to the center of the shaft 5. Reference numerals 7 and 8 shown in FIG. 1 designate a packing for sealing the substrate 1 and a cover for covering the packing 7.

In operation, when the throttle valve is rotated, the external connecting lever 4 is also rotated against the resilient force of the return spring 6 to thereby rotate the rotor 2. Upon rotation of the rotor 2, the first contact 9 fixed to the rotor 2 is slid on the opening detecting portion 15 of the substrate 1, and the second contact 10 is simultaneously slid on the idling position detecting portion 16 and the resin members 17. The opening detecting portion 15 generates an analog signal according to a rotational position of the throttle valve to detect the rotational position. The idling position detecting portion 16 detects an idling position when the contact 10 is positioned on the conductor 16a and the collector 16b, and is electrically connected therewith. In contrast, when the contact 10 is positioned on the resin members 17, and is electrically insulated from the idling position detecting portion 16, it is detected that the throttle valve position is out of the idling position.

Further, since the resin members 17 are substantially flush with the conductor 16a and the collector 16, that is, no stepped portion is formed therebetween, wear of the contact 10 may be prevented upon moving from the idling position detecting portion to the resin members 17. Additionally, since the resin members 17 have a smooth contact surface, wear of the contact 10 may be reduced during sliding.

Furthermore, as the collector 16b is located inside the conductor 16a, and the angle α of the collector 16b with respect to the center of the shaft 5 of the rotor 2 is greater by 1-5 degrees than the angle β of the conductor 16a, the outside conductor 16a may be used as a switching conductor to thereby enhance a detection accuracy of the idling position by the contact 10.

FIG. 6 shows a second preferred embodiment of the present invention, wherein a linear motion type opening sensor for the throttle valve is provided. In the linear motion type opening sensor shown in FIG. 6, the rotation of the throttle valve is converted to a linear motion by means of a cam (not shown), and an opening of the throttle valve is detected according to an amount of the linear motion. As shown in FIG. 6, according to the rotation of the throttle valve, first and second contacts 39 and 40 are slid on an opening detecting portion 45, an idling position detecting portion 46 and resin members 47 printed on a substrate 31. The opening detecting portion 45 generates an analog signal according to a rotational position of the throttle valve to detect the rotational position. The idling position detecting portion 46 detects an idling position when the contact 40 is positioned on the conductor 46a and the collector 46b, and is electrically connected therewith. In contrast, when the contact 40 is positioned on the resin members 47, and is electrically insulated from the idling position detecting portion 46, it is detected that the throttle valve position is out of the idling position.

Further, since the resin members 47 are substantially flush with the conductor 46a and the collector 46, that is, no stepped portion is formed therebetween, wear of the contact 40 may be prevented upon moving from the idling position detecting portion to the resin members 47. Additionally, since the resin members 47 have a smooth contact surface, wear of the contact 40 may be reduced during sliding.

In this embodiment, the arrangement of the conductor 46a and the collector 46b may be changed to each other. Further, the arrangement of a resistor 45a and a collector 45b of the opening detecting portion 45 may be similarly changed to each other.

Having thus described the preferred embodiment of the invention, it should be understood that numerous structural modifications and adaptations may be made without departing from the spirit of the invention.

What is claimed is:

1. In a throttle valve opening sensor including a substrate provided with an opening detecting portion for detecting openings of a throttle valve and a specific opening detecting portion for detecting a specific opening of said throttle valve, said specific opening detecting portion comprising a collector and a conductor, a rotor adapted to be rotated in association with rotation of said throttle valve, and first and second contacts mounted on said rotor and adapted to slide on said opening detecting portion and said specific opening detecting portion, thereby detecting the openings and the specific opening of said throttle valve; the improvement comprising forming said collector and said conductor of said specific opening detecting portion from a metal conductor formed of an alloy containing Ag in an amount less than 73% and Pd or other metals in an amount equal to or greater than 27%, said alloy being restrained from migration of Ag, and arranging a resin member on said substrate in connection with said collector and said conductor, said resin member being made substantially flush with said collector and said conductor, wherein said second contact is slid on said resin member.

2. In a throttle valve opening sensor including a substrate provided with an opening detecting portion for detecting openings of a throttle valve and a specific opening detecting portion for detecting a specific opening of said throttle valve, said specific opening detecting portion comprising a collector and a conductor, a rotor adapted to be rotated in association with rotation of said throttle valve, and first and second contacts mounted on said rotor and adapted to slide on said opening detecting portion and said specific opening detecting portion, thereby detecting the openings and the specific opening of said throttle valve; the improvement comprising forming said collector and said conductor of said specific opening detecting portion from a metal conductor, locating said conductor of said specific opening detecting portion outside said collector with respect to the center of said rotor, an angle of said collector with respect to the center of said rotor being greater by 1-5 degrees than an angle of said conductor, and arranging a resin member on said substrate in connection with said collector and said conductor, said resin member being made substantially flush with said collector and said conductor, wherein said second contact is slid on said resin member.

* * * * *